United States Patent [19]

See et al.

[11] 3,804,435
[45] Apr. 16, 1974

[54] VEHICLE ROLL-OVER SAFETY APPARATUS

[75] Inventors: George L. See, East Peoria; John B. Waggoner, Joliet, both of Ill.

[73] Assignee: Caterpillar Tractor Co., Peoria, Ill.

[22] Filed: Sept. 15, 1971

[21] Appl. No.: 180,611

[52] U.S. Cl........ 280/150 AB, 180/104, 280/150 C, 280/150 B, 280/150 SB
[51] Int. Cl............................................. B60r 21/08
[58] Field of Search.... 180/104, 82 C; 280/150 AB, 280/150 C, 150 B

[56] References Cited
UNITED STATES PATENTS

| | | | |
|---|---|---|---|
| 1,391,782 | 9/1921 | McDannold | 180/104 X |
| 1,735,743 | 11/1929 | Finn | 280/150 C |
| 2,850,291 | 9/1958 | Ziccardi | 280/150 AB |
| 3,588,142 | 6/1971 | Gorman | 280/150 AB |
| 1,204,144 | 11/1916 | Ellis | 280/150 C |
| 3,188,111 | 6/1965 | Ells et al. | 280/150 C |
| 2,263,978 | 11/1941 | Branovic et al. | 280/150 C |
| 3,430,979 | 3/1969 | Terry et al. | 280/150 AB |
| 3,617,073 | 11/1971 | Landsman | 280/150 AB |
| 3,630,472 | 12/1971 | Axenborg | 280/150 B X |
| 3,632,134 | 1/1972 | Babbitt, Jr. | 280/150 C |
| 2,705,529 | 4/1955 | Bull et al. | 180/82 C |

FOREIGN PATENTS OR APPLICATIONS 861,072  2/1961  Great Britain...................... 180/104

Primary Examiner—David Schonberg
Assistant Examiner—John P. Silverstrim
Attorney, Agent, or Firm—Fryer, Tjensvold, Feix, Phillips & Lempio

[57] ABSTRACT

An air bag restraint system is associated with a vehicle having a roll-over protection structure for protecting an operator during a vehicle roll-over. The restraint system is actuated by a sensor which is responsive to the tilting over of the vehicle past a predetermined angle.

9 Claims, 6 Drawing Figures

INVENTORS
GEORGE L. SEE
JOHN B. WAGGONER

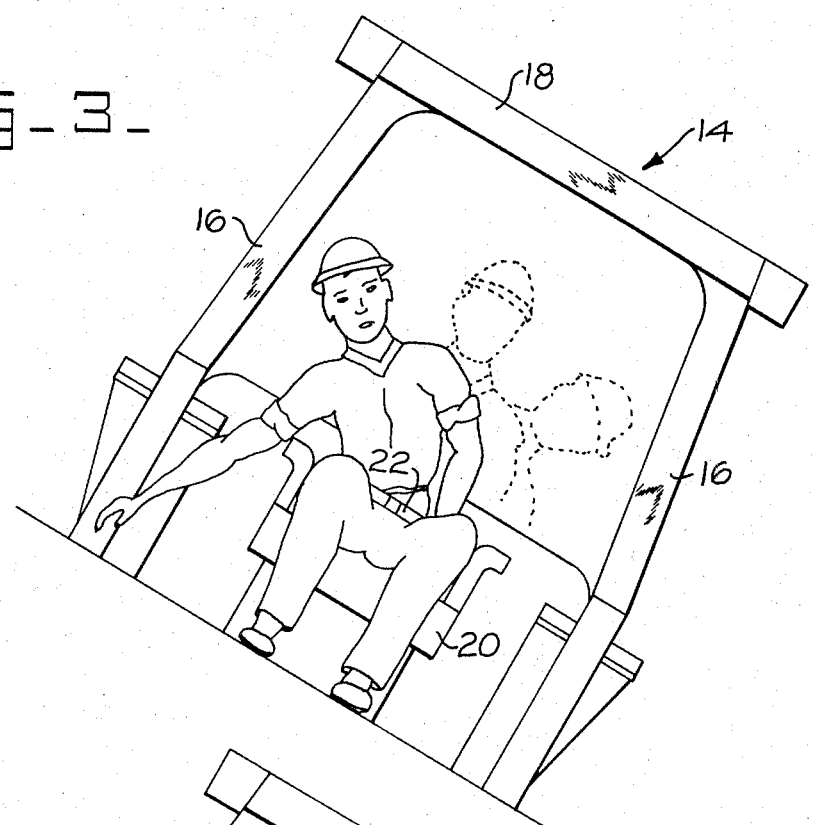
FIG-3-
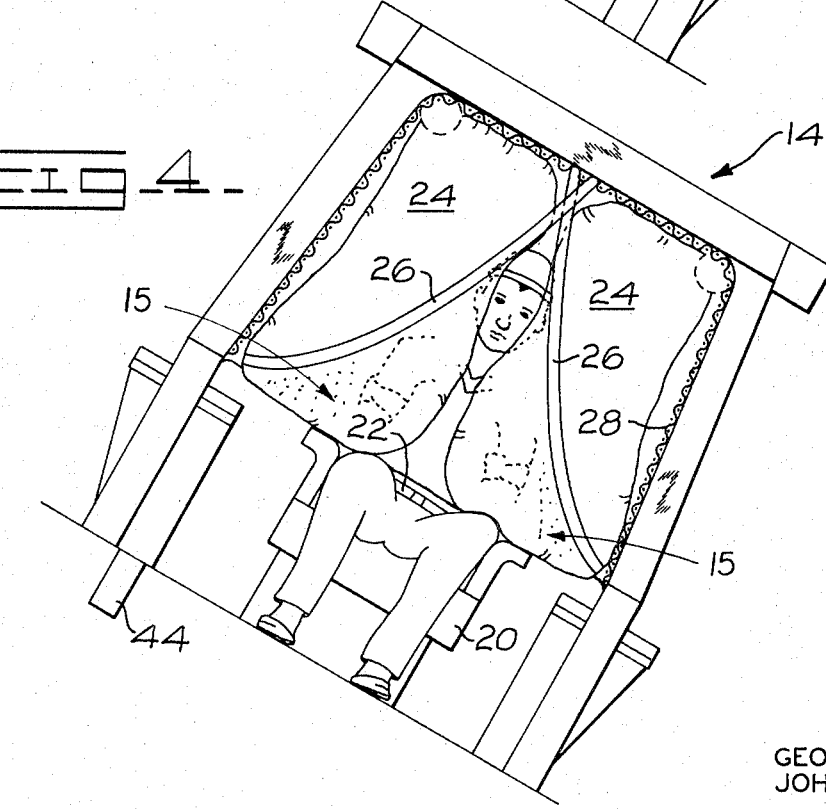
FIG-4-

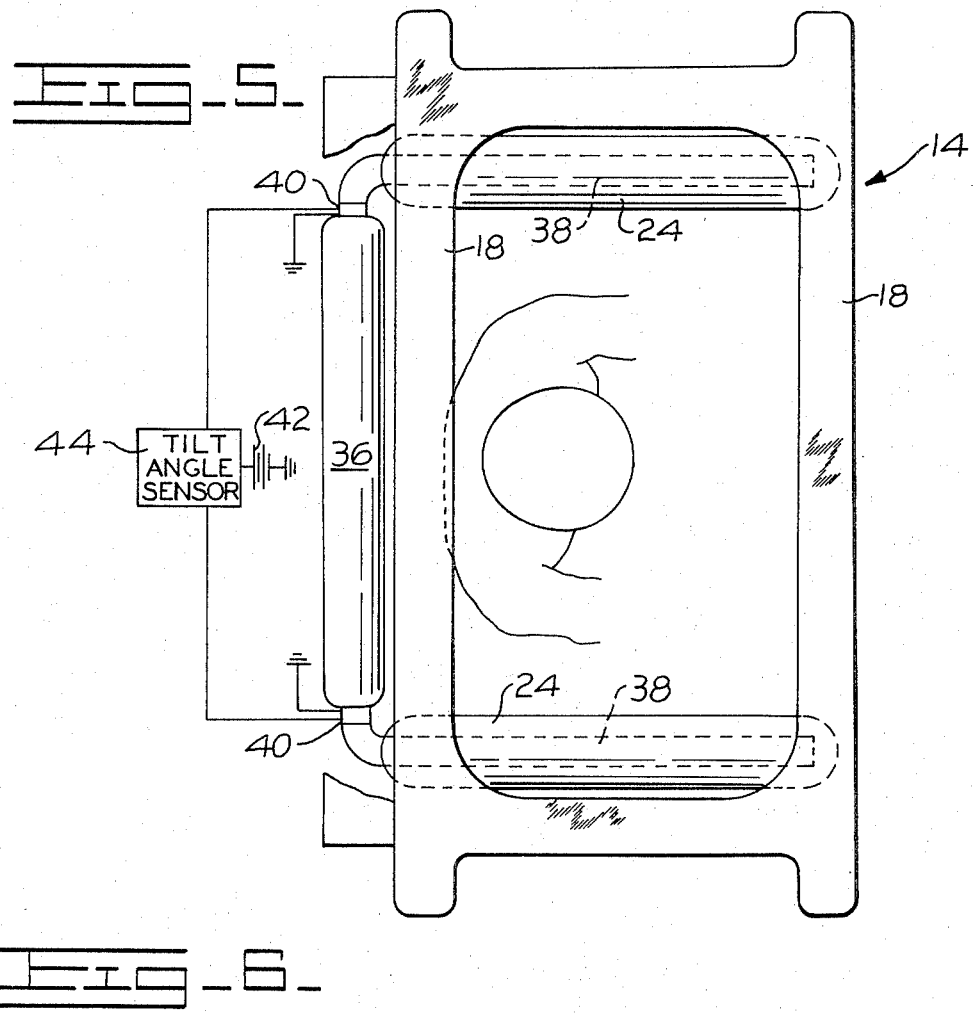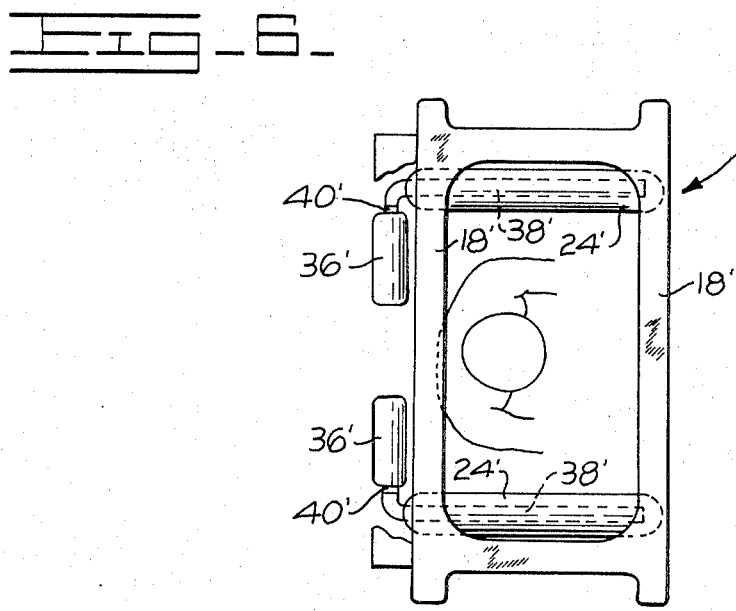

VEHICLE ROLL-OVER SAFETY APPARATUS

BACKGROUND OF THE INVENTION

This invention is concerned with an air-cushion restraint system applied to a vehicle for protecting the operator during vehicle roll-over. More particularly, this invention is related to the utilization of an air bag restraint system which is actuated by sensing means responsive to the tilting over of a vehicle, e.g., a heavy, earthmoving vehicle, past a predetermined angle.

Currently, a great deal of effort is being expended in an attempt to improve vehicle safety through the use of vehicle safety systems. In the broad automotive area, safety door latches, seat and lap belts, and padded dashboards and visors have become standard fixtures on most such vehicles. These restraint systems have proved to be of some help. However, it is well recognized that the next generation of vehicle safety systems will take the form of passive as opposed to active restraint systems. By "passive restraint systems" is meant safety systems which self-actuate from an undeployed to a deployed state without the intervention of the operator.

An example of this type of passive restraint system is the air-cushion or bag type of restraint system which is currently undergoing testing by the major auto manufacturers. Examples of this type of system are shown in Ekstrom, U.S. Pat. No. 3,567,245; Carey, U.S. Pat. No. 3,451,693; Bertrand, U.S. Patent No. 3,197,234. Ziccardi, U.S. Pat. No. 2,850,291. These and other prior art inventions are concerned with the safety of vehicle occupants wherein the primary danger results from a head-on collision. This concern leaves out an area wherein operator restraint is also critical. This is the area of the roll-over environment.

While the following discussion talks in terms of earthmoving vehicles, such is merely for convenience and it is to be understood that any vehicle may advantageously utilize the roll-over protection system of this invention. The immediately following discussion shall set forth the principal differences between safety considerations relating to the head-on collision environment as opposed to the roll-over environment.

Typical automotive systems now include a collapsed, inflatable bag structure which is placed so as to inflate into the cab of the vehicle occupant during collision. This typically means that the collapsed cushion is located on or near the dashboard and runs substantially its entire length. A source of gas pressure such as a tank is usually provided. Intermediate the gas tank and the collapsed bag is a valve means actuated by a sensor, which sensor is typically responsive to rapid deceleration, as would occur during impact. The signal for cushion deployment may also be initiated by other conditions but not by auto attitude, i.e., tilting angle, since attitude may not change during a crash.

By way of contrast, earthmoving vehicles are rarely involved in head-on collisions. On the other hand, earthmoving vehicles are frequently operated on steep hillsides wherein lateral tipping and rolling over is a real danger. In addition, earthmoving vehicles are subjected to impact during normal working conditions which would tend to erroneously trigger any acceleration sensor.

In the automotive environment, cushions must deploy quickly (about 0.04 second after signal) and must deflate soon after the crash (about 0.5 second). This is due to the fact that the cushion acts primarily as an energy absorber, with the occupant's body driving gas out of the cushion through exhaust holes contained therein. In addition, since the deployed cushion normally obscures operator vision, and the vehicle may not have come to rest, it is critical that the operator be able to see through the windshield shortly after impact. Rapid deflation is thus required.

With the earthmoving environment, cushions may deploy more slowly (up to 0.5 second after signal) but must stay inflated 15 to 20 seconds after inflation. This is due to the fact that the earthmoving vehicle may roll over several times. In addition, in this environment, the cushions act primarily as air springs which rebound when compressed. The deployed cushions or air bags encompass and resiliently support the operator during roll-over

SUMMARY OF THE INVENTION roll-over.

The instant invention takes the form of a means for protecting an operator and reducing possible injury to the roll-over of a vehicle. More particularly, the instant invention comprises operator restraint means for restraining an operator during vehicle roll-over and sensing means responsive to the tilting over of the vehicle beyond a predetermined angle for actuating the operator restraint means.

It is an object of this invention to provide an operator restraint means which serves to protect the operator during roll-over of the vehicle.

It is a further object of this invention to protect an operator during roll-over of a vehicle.

It is a further object of this invention to provide operator restraint means in the form of air bags which serve to protect the operator and reduce possible injury due to debris, i.e., rock, glass fragments, etc., coming into contact with the operator during vehicle roll-over.

It is a further object of this invention to provide an operator restraint means having sensor means for sensing incipient roll-over of a vehicle and which sensing means actuates an undeployed operator restraint means for subsequent deployment so as to protect the operator during roll-over.

It is a still further object of this invention to provide an operator restraint means for restraining an operator during vehicle roll-over by sensing tilting over of the vehicle past a predetermined point and thereupon actuating the pair of collapsed cushions from an undeployed state to a deployed state adjacent the operator so as to protect an operator from injury during roll-over of the vehicle.

Other objects of the invention will become apparent to those skilled in the art upon perusal of the following description and in light of the accompanying drawings which illustrate the preferred embodiments of the invention. Other embodiments using similar or equivalent structure will become obvious to those skilled in the art, without departing from the present invention as defined in the appended claims.

BRIEF DESCRIPTION OF THE DRAWINGS

FIG. 3 is a front elevation view of an operator station including a roll-over protection structure and illustrating the prior art position of an operator in solid line and in phantom line during vehicle roll-over.

FIG. 4 illustrates how the operator restraint means of the instant invention would preclude the operator movement shown in FIG. 3 during vehicle roll-over;

FIG. 5 is a top view, partially broken away, of an operator station having a roll-over protection structure and illustrating the operator restraint means prior to the development of the cushions as well as a block diagram illustration of the sensing means;

FIG. 6 is a view similar to FIG. 5 showing a second embodiment of the operator restraint means.

DETAILED DESCRIPTION

Figure 1:
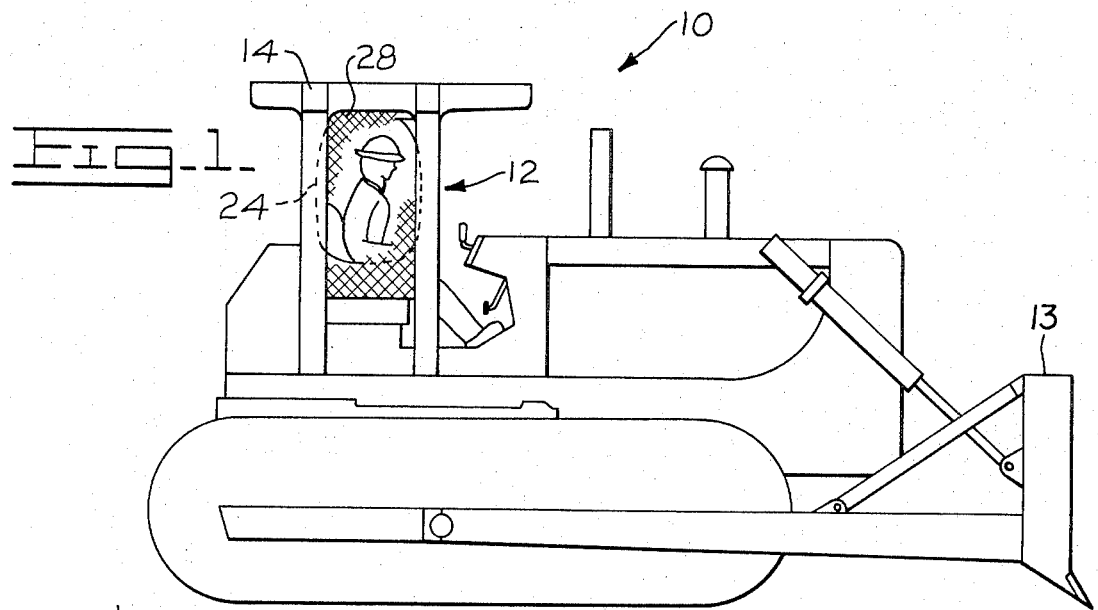
FIG. 1 is a side elevational view of a typical earthmoving vehicle, i.e., a track-type tractor having a roll-over protection structure mounted thereon and which utilizes the instant invention.

Shown generally at 10 in FIG. 1 is a typical vehicle in the form of a track-type tractor which may advantageously use the instant invention. This tractor includes an operator station shown generally at 12 having a roll-over protection structure (ROPS) 14 mounted thereover. This ROPS may be constructed as disclosed in U.S. Pat. No. 3,578,377 to Babbitt et al., which disclosure is hereby expressly incorporated by reference. While the operator is normally protected from a great deal of injury by the presence of such ROPS, injury may still occur due to the operator being thrown around inside the ROPS during vehicle roll-over as best seen in FIG. 3. The tractor also has mounted thereon a material handling implement in the form of a bulldozer blade 13 mounted on the front end thereof.

FIG. 3 shows in front elevation a typical operator work station which is protected by a ROPS 14 having a plurality of upright frame members 16 joined by a plurality of horizontal frame members 18. In addition, the operator is also typically restrained in seat 20 by means of a seatbelt 22.

FIG. 4 illustrates how the operator is restrained from lateral motion, and, therefore, protected from injury by utilization of the instant invention. The instant invention takes the form of a plurality of cushions or bags 24 which may be inflated to the position shown in FIG. 4. In their inflated state, each of the bags occupies substantially the entire half space on either side of the operator within the ROPS 14 as shown. A pair of flexible belts 26 may be provided to assist in retaining the bags in the operative, deployed position. Also assisting retention is screening 28 which is included over substantially the entire top and side openings of the ROPS. FIG. 1 also illustrates the extent of deployment of bags 24 against screening 28.

Figure 2:
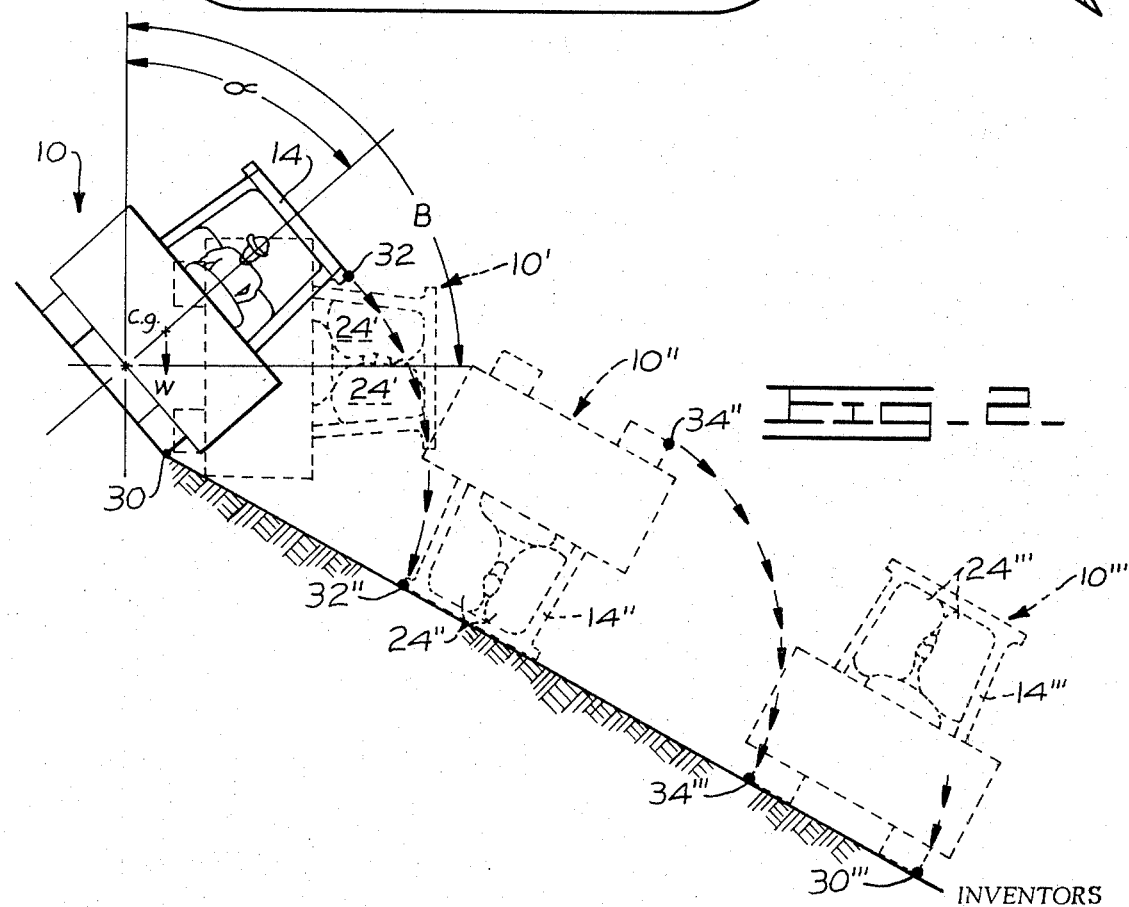
FIG. 2 is a front elevation sequential view of the vehicle of FIG. 1 undergoing a complete roll-over.

Turning now to FIG. 2, there is illustrated in sequence form the deployment of the operator restraint means as the vehicle rolls over. Vehicle 10 is illustrated laterally traversing a side slope wherein the vertical center line of the vehicle is at an angle alpha ($\alpha$) to the vertical. The vehicle is illustrated at the point of tipping wherein the vehicle center of gravity is vertically in line with the pivot point 30 on the downhill side of the leftmost track. If the vehicle laterally tilts beyond this predetermined angle of tilt alpha, a sensor (not shown) which is sensitive to tilt angle will trigger the inflation of the cushions.

As shown in phantom, when the vehicle has reaches position 10', shown in dotted lines, the cushions 24' will have fully inflated. As aforementioned, this inflation will occur in a time period of approximately 0.5 second after signal initiation. In terms of angles, inflation will have occurred in the segment defined by angle beta ($\beta$) minus angle alpha wherein angle beta is measured from the vertical center line of the vehicle to the vertical as shown. Normally, alpha and beta would approximate 60° and 90°, respectively.

The vehicle will then typically roll over until the leftmost edge 32 of the ROPS 14 strikes the ground and becomes a new pivot point about which the vehicle 10'' pivots.

The vehicle then continues to roll over to position 10''' wherein the roll-over may continue into a new cycle about pivot point 30''', etc. It may be noted that during the sequence from 10 to 10''' and beyond, the cushions would be fully deployed as shown, thereby protecting the operator from injury. At a future time point (not shown) of perhaps 14 seconds from the start of roll-over, the vehicle would have come to rest and the bags would automatically deflate by means of, e.g., very small sized exhaust holes 15 contained in the cushions as best seen in FIG. 4.

The cushions would be of conventional construction and would be of suitable material such as nylon. The cushions would have pores therein sized so as to retain air or other gas at approximately 2 psi for approximately 20–30 seconds from commencement of deployment. After this period has elapsed, sufficient air would have leaked from the cushions such that the operator could extricate himself from the ROPS. Since most vehicle roll-overs have been found by experience to be essentially complete in about 10 seconds, the 20–30 second inflation period should give an adequate margin of safety.

As seen in FIG. 5, the operator restraint system comprises the conventional gas reservoir tank 36 containing gas under pressure. Undeployed cushions are retained on either side and directly above the operator by means of frangible cords (not shown), with each cushion surrounding a separate gas manifold 38 having apertures therein (not shown) for distribution of gas into the cushions or bags. Intermediate each gas manifold and its respective end of tank 36 is a valve means 40 such as a frangible burst diaphragm. A burst diaphragm may have attached thereto an electrical squib as is conventional, which squib may be actuated by a source of electrical power 42, such as the vehicle electrical system.

Intermediate the source of electrical power 42 and each valve means is a tilt angle sensor 44 which is sensitive to vehicle attitude. The sensor may be mounted as shown in FIG. 4. This tilt angle sensor may be in the form of a conventional single pole, single throw mercury switch, such as Part No. A5431A manufactured by Micro Switch Corp., which is inherently set to complete a circuit from power source 42 to valve means 40 when the vehicle attains a predetermined angle with respect to the vertical. This angle would be set at a point wherein the vehicle center of gravity just exceeds the vehicle pivot point which would vary with different vehicles. Selection of the appropriate mercury switch would result in triggering at different preset angles, both to the right and left of center. Alternatively, other sensor means could be used.

FIG. 6 shows a second embodiment of the invention wherein a plurality rather than a single tank 36' is utilized. In this embodiment, the tilt angle sensor circuitry (not shown) would remain the same as with the first embodiment. Primes have been used throughout to denote structure having analogous correspondence in the first embodiment shown in FIG. 5.

It is to be understood that the foregoing description is merely illustrative of the preferred embodiments of the invention and that the scope of the invention is not to be limited thereto, but is to be determined by the scope of the appended claims.

What is claimed is:

1. In a vehicle having a material handling implement and an operator station having a roll-over protection structure in the form of a plurality of members therearound mounted thereon from which the vehicle and material handling implement may be operated, means responsive to vehicle roll-over for protecting the operator and reducing possible injury incident to roll-over of said vehicle comprising sensing means for actuating operator restraint means, said sensing means being responsive to the lateral tilting over of the vehicle past a predetermined angle at which the vehicle tips over, said operator restraint means comprising gas bags located so as to be deployable into a protective position generally encompassing the operator, and gas pressure source means actuable by said sensing means to communicate gas to fully deploy said gas bags over a given time after commencement of deployment, and wherein said means responsive to roll-over further comprises means to substantially deflate said gas bags over approximately 20 to 30 seconds after commencement of deployment.

2. The invention of claim 1 wherein said sensing means comprises means for generating an electrical signal and normally open switch means which closes when the vehicle tilts beyond said predetermined angle so as to provide a signal path to actuate said operator restraint means.

3. The invention of claim 2 wherein said switch means is a mercury switch.

4. The invention of claim 2 wherein said switch is a tilt-sensitive switch.

5. The invention of claim 1 wherein the means for protecting the operator further comprise seatbelt means.

6. The invention of claim 1 wherein said operator restraint means further comprise belt means for assisting in retaining the bags in the deployed position.

7. The invention of claim 6 wherein the number of bags is two and wherein said belt means comprise a belt for retaining each bag.

8. The invention of claim 6 wherein said operator restraint means further comprise screen means on said roll-over protection structure for further assisting in retaining the bags in the deployed position.

9. The invention of claim 1 wherein said roll-over protection structure defines a space for containing said operator and wherein said bags in their deployed position occupy substantially the entire half space on either side of the operator.

* * * * *